United States Patent [19]

Morin et al.

[11] 4,044,519

[45] Aug. 30, 1977

[54] INSULATED DOUBLE GLASS WINDOW ASSEMBLY

[76] Inventors: Wilfred F. Morin, 326 E. Taylor St., Suite B, Reno, Nev. 89502; Joseph A. Martini, 6555 Plumas St., Reno, Nev. 89501

[21] Appl. No.: 684,226

[22] Filed: May 7, 1976

[51] Int. Cl.² .................... G02B 5/24; E06B 7/00; E06B 3/24
[52] U.S. Cl. ...................... 52/304; 52/171; 350/267; 350/312
[58] Field of Search .............. 52/171, 172, 202, 203, 52/304, 616; 296/97 F; 350/3, 267, 312

[56] References Cited

U.S. PATENT DOCUMENTS

| | | | |
|---|---|---|---|
| 2,439,553 | 4/1948 | Winn | 52/171 X |
| 2,489,751 | 11/1949 | Candler | 350/267 |
| 2,596,566 | 5/1952 | Lacy et al. | 350/312 |
| 2,783,682 | 3/1957 | Swenson | 350/312 X |
| 3,001,300 | 9/1961 | Green | 52/171 |
| 3,016,801 | 1/1962 | Michel | 350/312 |
| 3,368,862 | 2/1968 | Dean | 350/312 |
| 3,388,490 | 6/1968 | Stechemesser | 350/312 X |
| 3,695,681 | 10/1972 | Dockery | 52/171 X |
| 3,724,929 | 4/1973 | Lacy | 350/312 |

*Primary Examiner*—J. Karl Bell
*Attorney, Agent, or Firm*—Sughrue, Rothwell, Mion, Zinn and Macpeak

[57] ABSTRACT

The specification discloses an improvement on double pane window assemblies comprising two at least generally parallel, spaced transparent or translucent panes defining a volume therebetween. The improvement comprises apparatus for selectively varying the color of the light passing through the panes.

5 Claims, 2 Drawing Figures

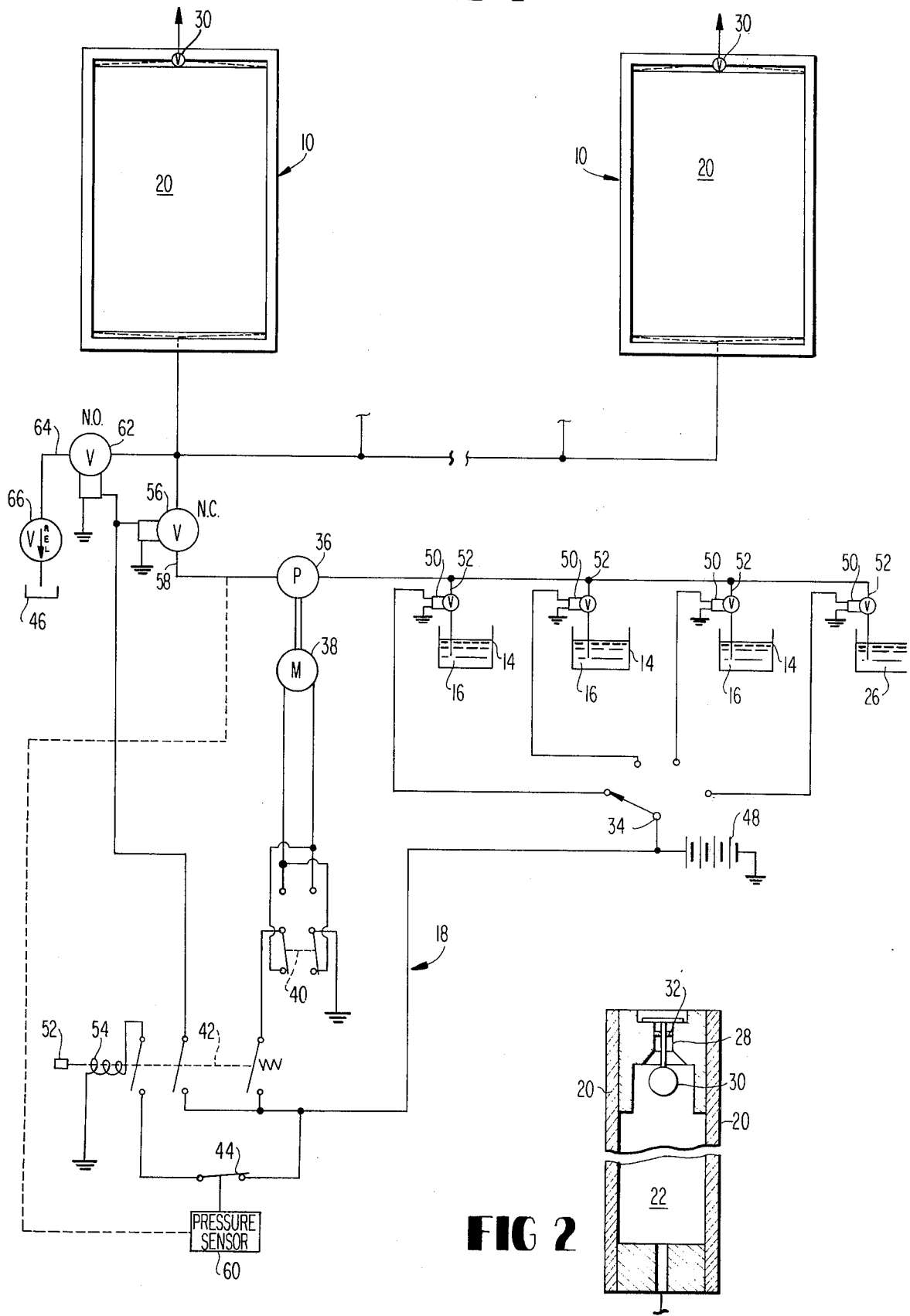

INSULATED DOUBLE GLASS WINDOW ASSEMBLY

FIELD OF THE INVENTION

This invention pertains to double pane window assemblies comprising at least two generally parallel, spaced transparent or translucent panes defining a volume therebetween.

SUMMARY OF THE INVENTION

The invention comprises apparatus for selectively varying the color of the light passing through the panes.

BRIEF DESCRIPTION OF THE DRAWINGS

FIG. 1 is a schematic drawing of an embodiment of the present invention.

FIG. 2 is an enlarged detail of the embodiment shown schematically in FIG. 1.

DETAILED DESCRIPTION OF THE ILLUSTRATED EMBODIMENT

FIG. 1 shows two double pane window assemblies 10, a plurality of liquid reservoirs 14 containing therein different colored liquids 16, and means 18 for selectively causing the liquid 16 from one or another of the liquid reservoirs 14 to enter the double pane window assemblies 10.

The double pane window assemblies 10 (of which, as illustrated in FIG. 1, there may be an arbitrary number) comprise two at least generally parallel, spaced transparent or translucent panes 20 (see FIG. 2) defining a volume 22 therebetween. The panes 20 are typically made of glass, but they may also be made of suitable translucent or transparent plastics or any other material suitable for use as a window pane.

In addition to the reservoirs 14 for different colored liquids, the assembly 10 comprises a further liquid reservoir 24 containing a cleaning liquid 26. The exact nature of the cleaning liquid 26 will depend on the natures of the colored liquids 16 and the window panes, the cleaning liquid 26 being chosen so as to be non-reactive with both the colored liquids 16 and the window panes, but being adapted to remove any lingering drops of one colored liquid 16 before a different colored liquid 16 is caused to enter the volume 22.

In the presently preferred embodiment, the colored liquids 16 are insulating liquids, Prestone brand antifreeze being one suitable insulating liquid which is available on the market in two different colors.

A port 28 is preferably provided between the panes 20 at the top of the window assembly 10 to permit air to exit from the volume 22 as one of the liquids 16, 26 enters the volume and to enter the volume as one of the liquids exits from it. The port 28 is provided because, if it were not there, the liquids would vaporize as the internal pressure was reduced as the liquids were withdrawn from the volume 22, the panes 20 would have to be built to withstand the pressure differential between the internal vacuum and the external air-pressure, and the pump, described hereinafter, would have to be much more elaborate than is required given the port 28.

A check-valve 30 is mounted in the port 28 to close it when the volume 22 has been filled with one of the liquids. The check-valve 30 prevents the liquid from leaking out of the top of the assembly when the volume 22 is reduced due to thermal and/or pressure variations outside the window assembly 10, and it also causes a pressure build-up when it closes which causes the fluid-injecting pump, described hereinafter, to stop pumping a liquid into the volume 22.

A filter 32 is also preferably mounted in the port 28 to reduce the entrance via the port 28 of extraneous materials, such as dust, into the volume 22.

While many means 18 for selectively causing the liquids 16, 26 to enter and leave the volume 22 could be devised, one such means will now be described. As illustrated in FIG. 1, the means 18 comprises a liquid selector switch 34, a pump 36, a reversing motor 38, a double-pole switch 40, a motor on-off switch 42, a pressure switch 44, an overflow sump 46, and a source of electrical power 48.

The liquid selector switch 34 is operatively connected to a plurality of normally closed solenoid valves 50, whereby the conduit 52 into each reservoir 14, 24 is open when the selector switch is turned to the associated contact but otherwise closed. The reversing motor 38 is controlled by the double-pole switch 40, whereby it causes the pump 36 to pump liquid from one of the reservoirs 14, 24 into the volumes 22 when the switch is thrown one way and to pump liquid from the volumes 22 back into one of the reservoirs 14, 24 when the switch is thrown the other way. Obviously, fail-safe controls could be provided to insure that liquid from the volumes 22 could only be pumped back into the reservoir from which it came, thereby removing the possibility of different colored liquids being inadvertently mixed in the reservoirs and of causing a pressure overload on the pump 36.

The motor on-off switch 42 is controlled by a button 52, which is conveniently located on a control panel (not shown) with the handles of the double pole switch 40 and of the selector switch 34. The on-off switch 42 is normally biased open, but when it is pushed shut by finger pressure on the button 52, current passing through the pressure switch 44, which is normally biased closed, causes a solenoid 54 to actuate, holding the switch 42 shut until the switch 44 is opened by means described hereinafter. That allows the user of the device to cause the device to go through a complete filling cycle without having to maintain finger pressure on the button 52 while the volumes 22 are filling.

A normally closed solenoid valve 56 is provided in the main conduit 58 downstream of the pump 58 but upstream of the branch point leading to the various window assemblies 10. When the switch 42 is closed, the solenoid valve 56 is opened, and the liquid is either pumped from the selected one of the reservoirs 14, 24 to the volumes 22 or vice versa, depending on the orientation of the double-pole switch 40. Assuming that the switch 40 is set to cause liquid to be pumped into the volumes 22, the pumping continues until the liquid rises in the volume 22 high enough to cause the check-valve 30 to seat in the port 28. At that instant, the back-pressure senser 60 causes the switch 44 to open, deactivating the solenoid 54, allowing the switch 42 to open, therefore turning off the motor 38 which drives the pump 36, and allowing the normally closed solenoid valve 56 to close, trapping the desired liquid in the volumes 22.

As is well known in the art, the volume defined by the panes of a double-pane window assembly such as this one is subject to a surprising degree of variation caused by change in the temperature and/or pressure on each side of the assembly. Since the volume of the liquid 16, 26 contained in the volumes 22 will not vary exactly with the volume defined by the panes 20, means must be provided to compensate for these inherent variations. While various such means are well known in the art, one such means is illustrated in FIG. 1. It comprises the previously mentioned overflow sump 46, a normally open solenoid valve in parallel with the normally closed solenoid valve 56, and the extension of the volumes 22 somewhat above the top part of the panes 20 through which light passes (see FIG. 2). When the check-valve 30 seats in the port 28, causing the switch 42 to open and the solenoid valve 56 to close, the solenoid valve 62 opens, allowing liquid from the volumes 22 to flow in the conduit 64 as far as the release valve 66 (which should be located as close to the solenoid valve 62 as possible in order to minimize loss of the liquids into the sump 46 and to avoid chatter from re-activation of the motor 38 due to the check-valve 30's becoming unseated because of a flow of liquid into the conduit 64 between the solenoid valve 62 and the release valve 66). The relief valve 66 is set at some pre-determined pressure so that, when the volumes 22 contract more than the volume of the liquids contained therewithin, the excess liquid is bled off through the relief valve 66 to the sump 46. On the other hand, when the volumes 22 expand more than the volume of the liquid contained therewithin, the level of the liquid simply declines in the top part of the volumes 22 above the parts of the panes through which light passes.

Of course, the pressure-relief mechanism described herein results in a small waste of the liquids 16, 26, since the various liquids are intermingled in the sump 46, requiring the reservoirs 14, 24 to be topped up from time to time. Accordingly, it may be found desirable to lead the conduit 64 directly back to the reservoirs 14, 24 via parallel conduits containing solenoid valves assuring drain off of the liquid only into the appropriate reservoir.

When it is desired to change the color of the window assembly 10, the double pole switch 40 is reversed, the liquid selector switch 34 is checked to make sure that it is turned to the empty reservoir, and the button 52 is depressed, causing the motor on/off switch 42 to close, and the solenoid valve 56 to open. The motor 38 then begins to run, causing the pump 36 to pump the liquid 16, 26 back from the volumes 22 into the appropriate reservoir. It should be noted that, because the pressure senser 60 will initially sense a high pressure in the conduit 58, it may be necessary to keep the button 52 depressed an instant longer when initiating an emptying of the volumes 22 than when initiating a filling thereof. When the last of the liquid passes the pressure senser 60 in the conduit 58, the switch 44 opens, de-energizing the solenoid 54 and allowing the switch 42 to open, turning off the motor 38 and closing the solenoid valve 36. After that, it is of course contemplated that the cleaning liquid 26 will be pumped into and out of the volumes 22 before a different colored liquid 16 is pumped therein.

Despite use of the cleaning liquid 26, the purity of the colored liquids 16 will eventually begin to degrade after a number of cycles of filling and emptying the volumes 22 with different colored liquids, the exact number of cycles depending on the efficacy of the cleaning fluid 26 and the standards of purity imposed on the colored liquids. Accordingly, it is desirable to mount the reservoirs 14, 24 for easy removal and to design them for easy emptying, cleaning, and refilling. Similarly, of course, it is necessary to design the sump tank 46 so that it can be emptied periodically and cleaned and the filter 32 so that it can be replaced periodically.

While the foregoing description has spoken of various different colored liquids selectively varying the color of the light passing through the window, it is within the scope of this invention that one of the liquids may be opaque, precluding the passage of any light through the window.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. An apparatus for selectively varying the color of a window, said apparatus comprising:
   a double pane window assembly comprising two at least generally parallel, spaced transparent or translucent panes defining a volume therebetween,
   at least three liquid reservoirs containing respectively two different colored antifreeze liquids and a cleaning liquid capable of removing residue antifreeze liquid from said window volume,
   conduit means for connecting said liquid reservoirs to said double pane window assembly and opening to said volume,
   a pump operatively positioned within said conduit means intermediate of said liquid reservoirs and said double pane window assembly,
   solenoid valve means within said conduit means between each liquid reservoir and said pump for selectively connecting said pump to a given liquid reservoir,
   a reversible electric motor for driving said pump,
   switch means for controlling reversible energization of said pump motor, and
   selector means for preventing energization of more than one of said solenoid means such that between pumping of different colored antifreeze liquids to and from said window volume assembly, said cleaning liquid may be pumped from its liquid reservoir to said window assembly to flush residue antifreeze liquid from said volume.

2. Apparatus as recited in claim 1, wherein said window assembly is generally vertical and said apparatus further comprises a check valve mounted in a port between said panes at the top of said window assembly for permitting air to exit from the volume between the panes as one of the liquids enters said volume and to close off said port when the liquid reaches the top of the volume to effect pressurization within said volume and said conduit means and wherein said apparatus further comprises a pressure relief valve within said conduit means intermediate of said pump and said window assembly to relieve liquid line pressure, and a pressure sensor operatively coupled to said means for energizing said pump and responsive to a predetermined line pressure for terminating pump operation and preventing excess pressure within said volume and said conduit means.

3. The apparatus as claimed in claim 2, further comprising a solenoid valve within said conduit means between said pump and said window assembly and means responsive to termination of pump motor energization for opening said solenoid valve to permit said pressure relief valve to relieve excessive line pressure in said conduit means between said pump and the check valve carried by said window assembly.

4. Apparatus as recited in claim 2 and further comprising a filter mounted in said port to reduce the entrance via said port of extraneous materials, such as dust, into the volume between said panes.

5. The apparatus as claimed in claim 4, further comprising a solenoid valve within said conduit means between said pump and said window assembly and means responsive to termination of pump motor energization for opening said solenoid valve to permit said pressure relief valve to relieve excessive line pressure in said conduit means between said pump and the check valve carried by said window assembly.

* * * * *